March 13, 1956  W. E. CLACK  2,737,976
FOUR PORT REVERSING MULTI-WAY VALVE UNIT
Filed April 24, 1953  2 Sheets-Sheet 1
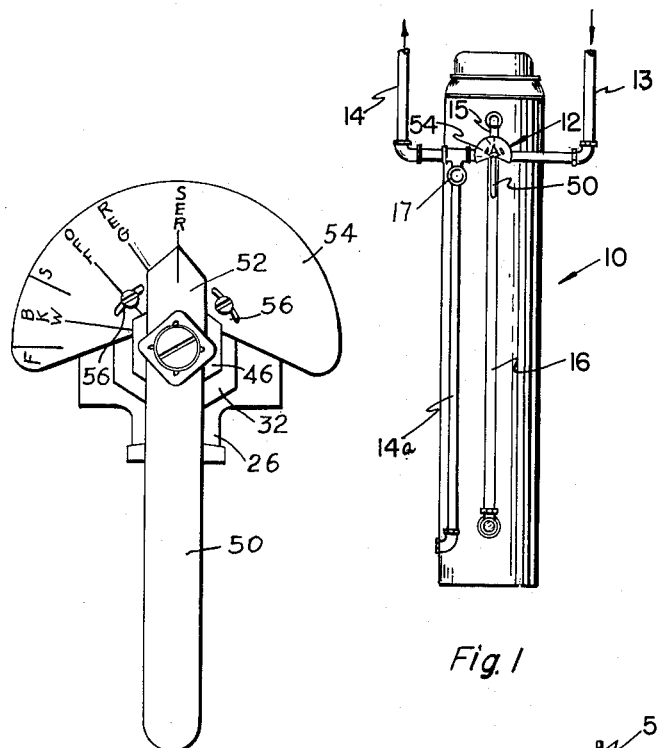
Fig. 7
Fig. 1
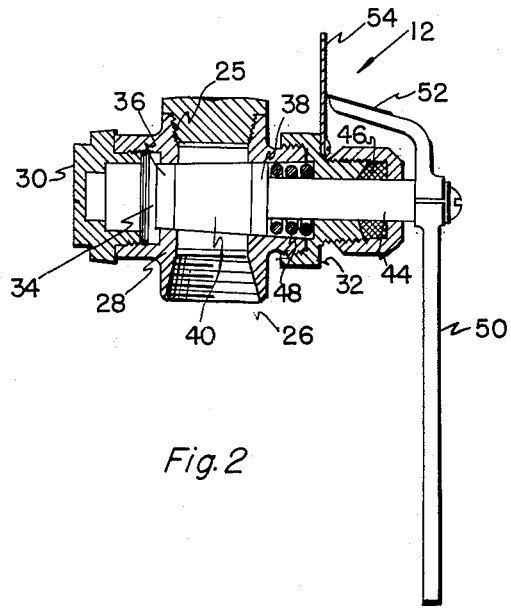
Fig. 2
INVENTOR.
Willis E. Clack
BY Joseph G. Werner
ATTORNEY INVENTOR.
Willis E. Clack
BY Joseph G. Werner
ATTORNEY United States Patent Office 2,737,976
Patented Mar. 13, 1956

2,737,976

FOUR PORT REVERSING MULTI-WAY VALVE UNIT

Willis E. Clack, Madison, Wis.

Application April 24, 1953, Serial No. 351,016

2 Claims. (Cl. 137—556.3)

This invention relates to improvements in water treatment equipment, particularly water softening equipment, and, in its specific aspects, relates to improvements in multi-way valves designed primarily for use with such equipment.

A principal object of the invention is to avoid the complex operation attendant upon conventional water treating equipment which customarily employs a plurality of separate valves individually manipulated and to effect a much simpler and more accurate operation of such equipment by providing a single valve for performing the work of the plurality of valves heretofore required.

Another principal object is to provide a combined valve and adjustable face-place for initially indexing relative positions of the valve whereby to facilitate various operations thereof such as effecting a controlled rinse rate and house line shut-off.

A further object is to provide a water treatment equipment control valve simply constructed of relatively few parts, economical from the standpoint of part and assembly costs and extremely durable and efficient in operation with a minimum of maintenance expense.

Other objects and advantages of the invention will be apparent from the following detailed explanation taken in conjunction with the accompanying drawings wherein a preferred embodiment of the principles of the invention has been selected for exemplification.

In the drawings:

Fig. 1 is a front elevational view of a water softener and water filter tank shown equipped with the novel valve control means of the present invention;

Fig. 2 is an enlarged vertical sectional view through the control valve shown in Fig. 1;

Fig. 7 is an enlarged front elevational view of the valve showing details of the adjustable face-plate.

Figure 3:
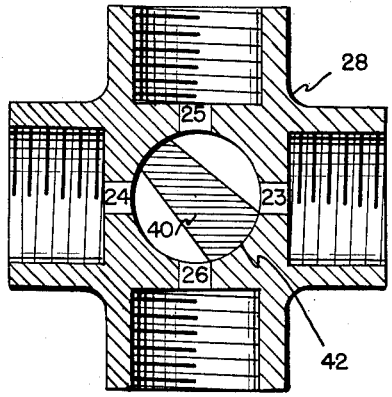
Figs. 3, 4, 5 and 6 are enlarged vertical transverse sectional views of the valve shown in Fig. 2 illustrating various relative positions of the valve core and ports incident to the operations, respectively of service, backwash, closed or pressure release and regeneration.

Referring more particularly to the drawings wherein like numerals refer to like parts, the water softener and water filter tank indicated in its entirety at 10 in Fig. 1 is of the domestic household type but it is to be understood that the invention is equally as applicable to commercial and industial equipment and for other uses. The usual tank raw water inlet pipe 13, outlet pipe 14 for soft or conditioned water, upper tank pipe 15 and bottom tank pipe 16 are connected, respectively, to the elongated ports 23, 24, 25 and 26 of the valve assembly which is indicated in its entirety at 12. A drain pipe 14a having a conventional drain valve 17 is also connected to the port 24, as shown.

The valve assembly 12, as shown in Fig. 2 is composed of a main body portion 28, a threadedly connected rear body portion 30 and a threadedly connected front body portion 32. A tapered plug or core 34 has frustoconical ends 36 and 38 seated in the main body portion 28 and an intermediate symmetrically tapered or wedge-shaped web 40. One arcuate end 42 of the tapered web 40 is wider than the other end and, as apparent from Figs. 3–6 is sufficiently wide to more than cover a valve port.

A stem 44 for the core 34 projects forwardly of the valve body through a packing gland 46 threaded to the front portion 32 and a spring 48 properly tensions the core 34 against leakage and for easy rotary movement. Provision of the spring 48 forwardly, as shown, facilitates disassembly of the valve for replacement of the core or other repairs or adjustments.

Fixed to the forwardly projecting end of the stem 44 is a hand lever 50 which terminates in a pointer arm 52 for cooperating with face-plate 54 to index the various operating positions of the valve assembly. The face-plate 54 is secured preferably to the front portion 32 of the valve body and as best shown in Fig. 7 elongated slots 56 are provided for the securing means so as to provide a fine adjustment of the valve assembly necessary particularly for the preselected rate of flow during the regeneration operation as will be hereinafter described.

The face-plate 54 carries successive graduations with which the pointer arm 52 may be selectively aligned and successive indicia, "Ser.," to indicate the service position of the valve assembly as shown in Fig. 3; "Reg.," to indicate the regeneration position of the valve assembly as shown in Fig. 6; "Off," to indicate the off position of the valve assembly as shown in Fig. 5; and "Bkw.," to indicate the backwash position of the valve assembly as shown in Fig. 4; the solid line position of the core web 40 corresponding to the "F" or fast rate and the broken line position corresponding to the "S" or slow rate of flow.

Referring now more particularly to the valve positions for the various operations aforesaid, it will be apparent from Fig. 3 that the gate or web 40 in the "Service" position permits free communication between the inlet 23 and the port 25 leading to the top of the tank and between the port 26 from the bottom of the tank to the outlet portion 24.

Figure 4:
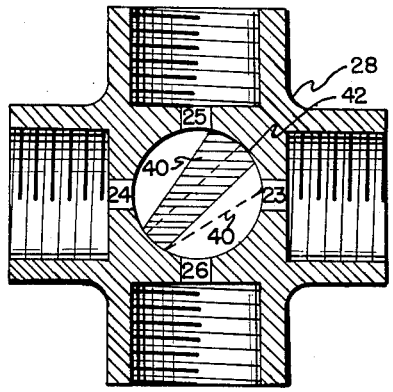

The "Backwash" position shown in Fig. 4 provides for communication between inlet port 23 and the port 26 to the bottom of the tank and from the port 25 from the top of the tank to the outlet 24. Shifting of the gate 40 between its solid line position and its broken line position, as shown, as when the handle 50 is in alignment with the designations "F" or "S," respectively, will control the rate of flow of inlet water from fast to slow.

Figure 5:
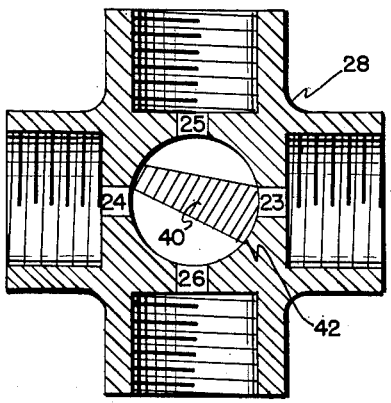
Figure 6:
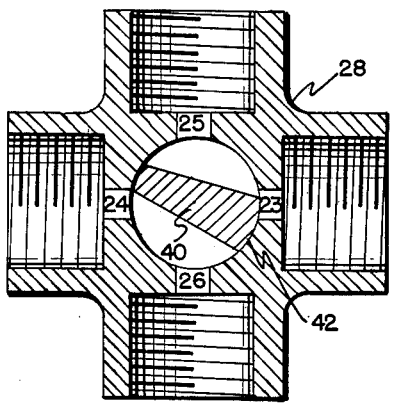

In the "Off" position shown in Fig. 5 the inlet 23 is closed by the larger end 42 of the gate 40 and the ports 26 and 24 are in communication to permit release of pressure and draining of the tank from the bottom thereof through the outlet 14 and the drain 14a.

In the "Regeneration" position shown in Fig. 6 the end wall 42 of the gate 40 partially restricts flow from the inlet port 23 to the top of the tank but regardless of the degree of restriction the communication between the ports 26 and 24 remains unrestricted. With such reduction of inlet flow outlet water passes only to the outlet drain 14a, assuming the drain valve 17 is open and is not permitted to flow through the outlet line 14 for household use. The proper degree of inlet flow restrictions will vary in different installations but appropriate valve positioning may be provided in each case by adjustment of the plate 54 on the slotted connections 56 so as to bring the web 40 of the valve core 34 into the desired control position.

Although the gate 40 is not shown in aligned position with opposed ports 23—24 or 25—26, it will be readily apparent that all communication between the ports is closed when the gate is on either of these positions.

It will be understood that the present invention is not confined to the particular construction and arrangement of parts herein illustrated and described but embraces all such modifications thereof as are within the scope of the following claims.

I claim:

1. A valve member which comprises, a main valve body portion, a plurality of opposed ports radially disposed in the wall of said main valve body portion for connection with conduits, a tapered core seated for rotary movement in said main valve body portion and opposed end portions carried by said tapered core for sealing said ports, one of said end portions being relatively wider than the other so as to seal one of said ports while the opposed port remains substantially fully open.

2. A valve member which comprises, a main valve body portion, a plurality of opposed ports radially disposed in the wall of said main valve body portion for connection with water conduits, a tapered core seated for rotary movement in said main valve body portion, opposed end portions carried by said tapered core for sealing said ports, one of said end portions being relatively wider than the other so as to seal one of said ports while the opposed port remains substantially fully open, and a face-plate adjustably connected to said valve body portion whereby selectively to position said tapered core relative to said ports.

References Cited in the file of this patent
UNITED STATES PATENTS

| | | |
|---|---|---|
| 715,266 | Heston | Dec. 9, 1902 |
| 974,185 | Quickel | Nov. 1, 1910 |
| 987,939 | Anderson | Mar. 28, 1911 |
| 1,620,717 | Brice et al. | Mar. 15, 1927 |
| 1,764,155 | Daniels | June 17, 1930 |
| 1,873,306 | De Ville | Aug. 23, 1932 |
| 1,903,958 | Clark | Apr. 18, 1933 |
| 1,929,405 | Bidle | Oct. 10, 1933 |
| 1,938,869 | Shimerda | Dec. 12, 1933 |
| 2,145,132 | Riney | Jan. 24, 1939 |